Jan. 12, 1926.

L. M. ASPINWALL ET AL 1,569,349

AXLE POWER BRAKE

Filed Jan. 23, 1920 6 Sheets-Sheet 1

WITNESSES:
H.J.Shelhamer
W.R.Coley

INVENTORS
Louis M. Aspinwall &
Karl A. Simmon
BY
Wesley E. Carr
ATTORNEY

Jan. 12, 1926. 1,569,349
L. M. ASPINWALL ET AL
AXLE POWER BRAKE
Filed Jan. 23, 1920 6 Sheets-Sheet 2

WITNESSES:
H. J. Shelhamer
W. R. Coley

INVENTORS
Louis M. Aspinwall &
Karl A. Simmon
BY
Wesley G. Carr
ATTORNEY

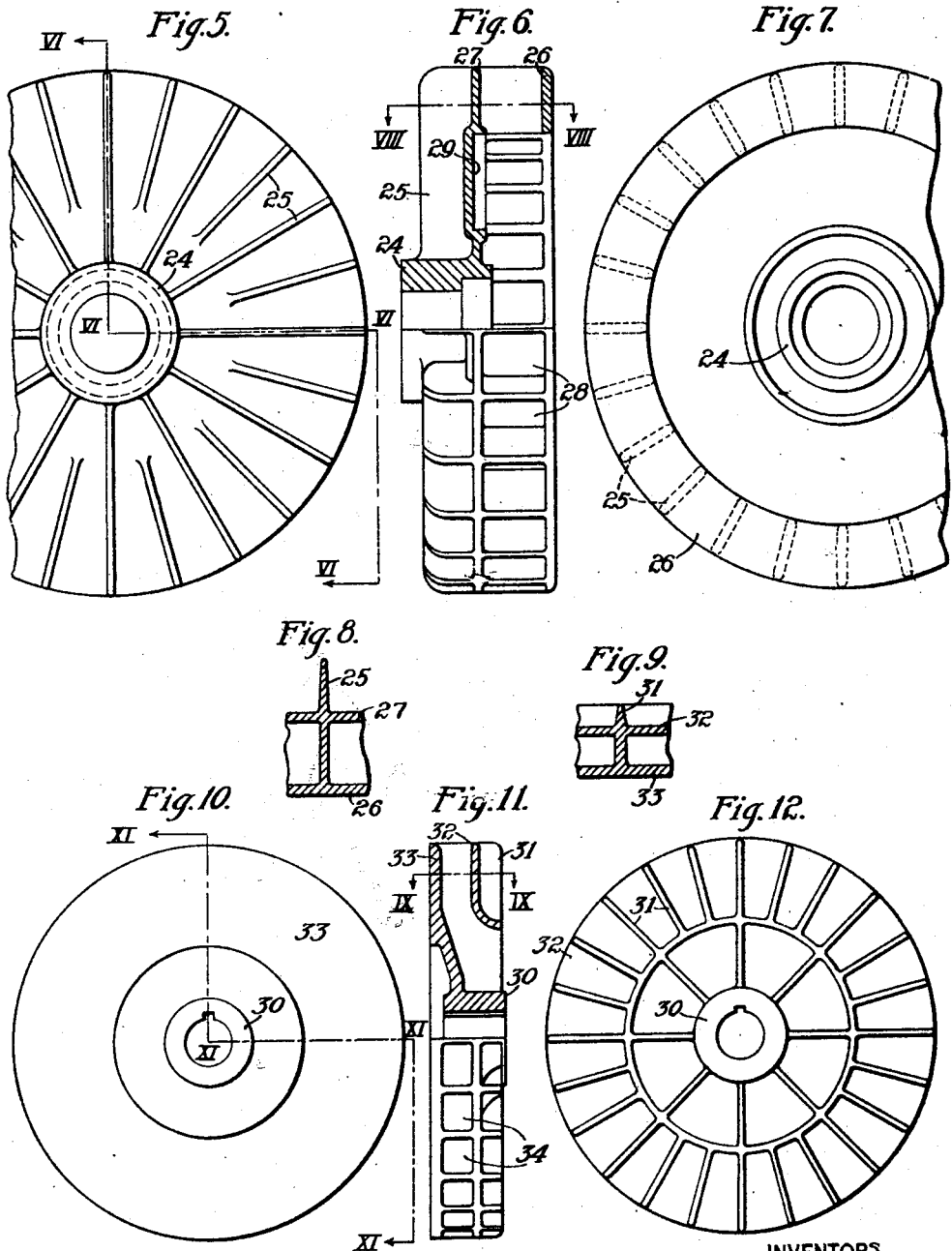

Jan. 12, 1926. 1,569,349
L. M. ASPINWALL ET AL
AXLE POWER BRAKE
Filed Jan. 23, 1920 6 Sheets-Sheet 4
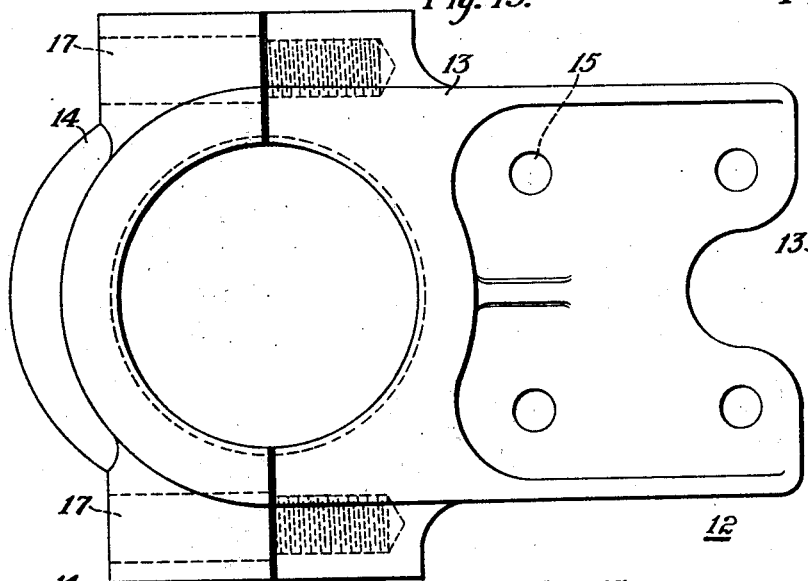
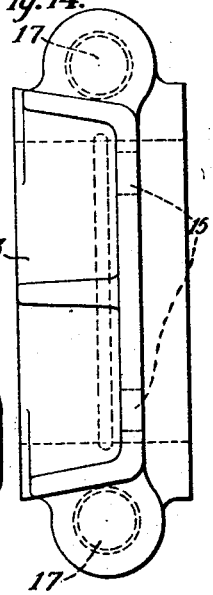
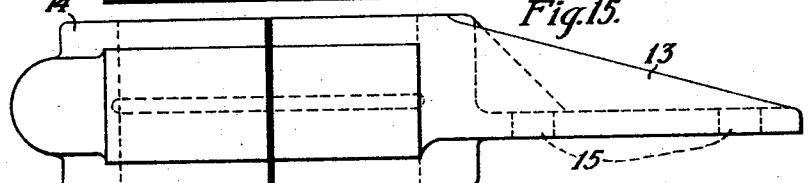
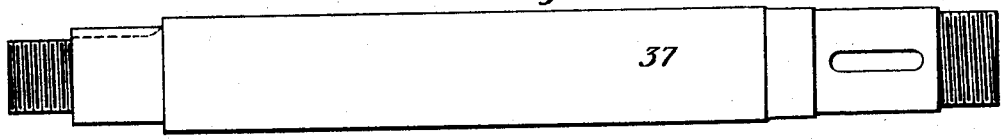
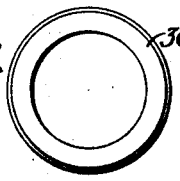
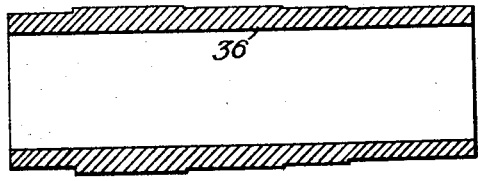
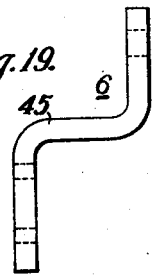
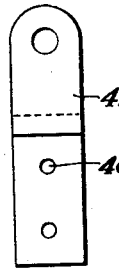
WITNESSES:
H. J. Shelhamer
W. R. Coley
INVENTORS
Louis M. Aspinwall &
Karl A. Simmon
BY
Wesley G. Carr
ATTORNEY

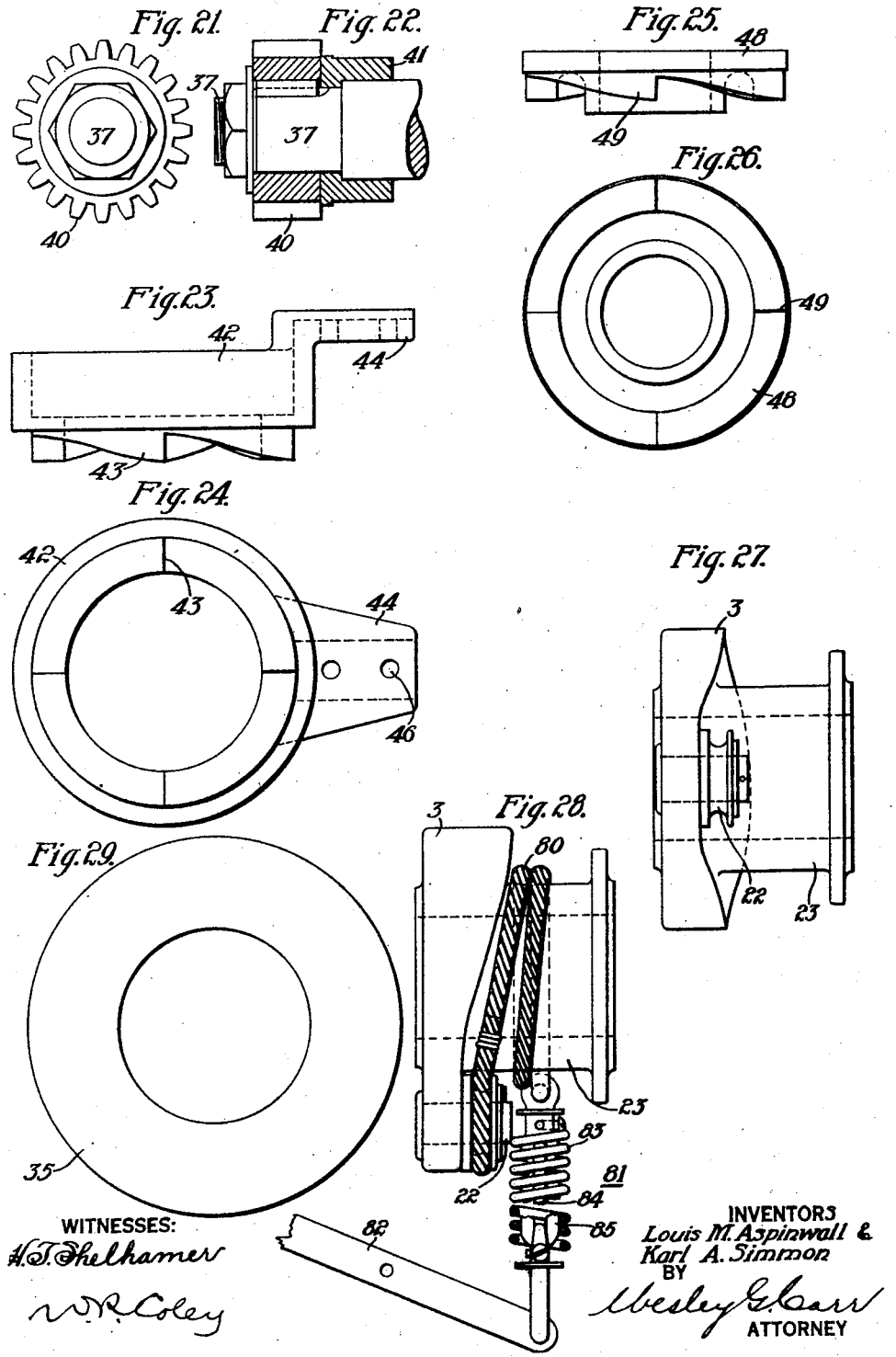

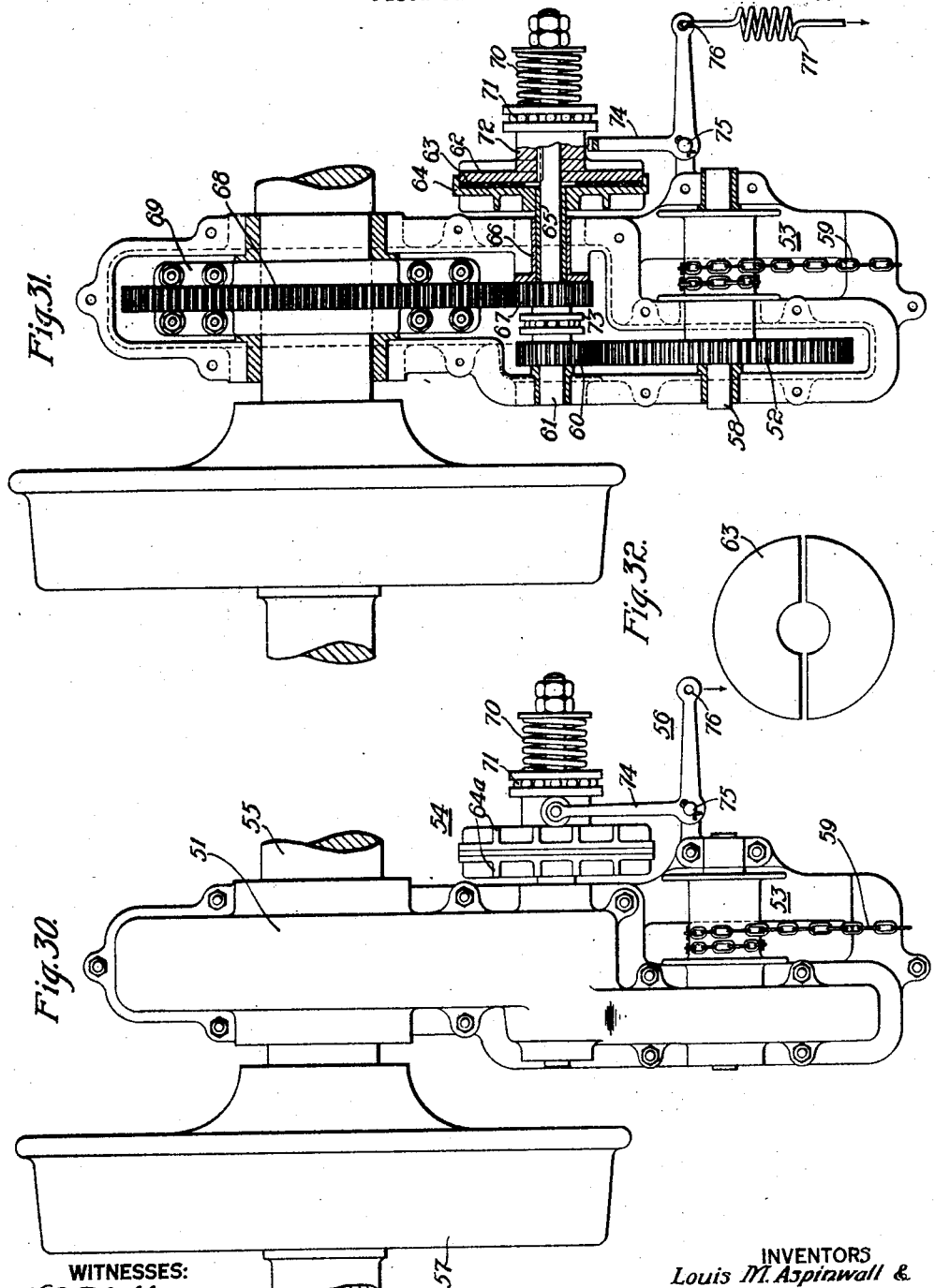

Patented Jan. 12, 1926.

1,569,349

UNITED STATES PATENT OFFICE.

LOUIS M. ASPINWALL, OF PITTSBURGH, AND KARL A. SIMMON, OF EDGEWOOD PARK, PENNSYLVANIA, ASSIGNORS TO WESTINGHOUSE ELECTRIC & MANUFACTURING COMPANY, A CORPORATION OF PENNSYLVANIA.

AXLE-POWER BRAKE.

Application filed January 23, 1920. Serial No. 353,537.

*To all whom it may concern:*

Be it known that we, LOUIS M. ASPINWALL, a citizen of the United States, and a resident of Pittsburgh, in the county of Allegheny and State of Pennsylvania, and KARL A. SIMMON, a citizen of the United States, and a resident of Edgewood Park, in the county of Allegheny and State of Pennsylvania, have invented a new and useful Improvement in Axle-Power Brakes, of which the following is a specification.

Our invention relates to braking apparatus for railway vehicles and it has special relation to brakes of the type that derive the brake-applying power from the movement of the vehicle axle, or the like.

One object of our invention is to provide a relatively simple, reliable and practical axle-power brake that is constructed as a self-contained unit, one end of which may be supported on a car axle and the other end of which may be spring-supported from the truck frame or car body.

Another object of our invention is to provide braking apparatus that is particularly applicable to the well-known "safety" or "one-man" cars, whereby the air-braking apparatus that is commonly employed in this type of car at the present time may be entirely omitted, with resultant economies in cost, weight and space requirements.

Another object of our invention is to provide a brake of the above-indicated character embodying a clutch device that, in addition to its brake-applying function, is adapted to act as a ventilating fan to maintain the temperature of all parts of the clutch device below predetermined limits.

Other objects of our invention directed toward simplicity of construction and reliability of operation will become evident from the following detailed description taken in conjunction with the accompanying drawings, wherein—

Figure 1:
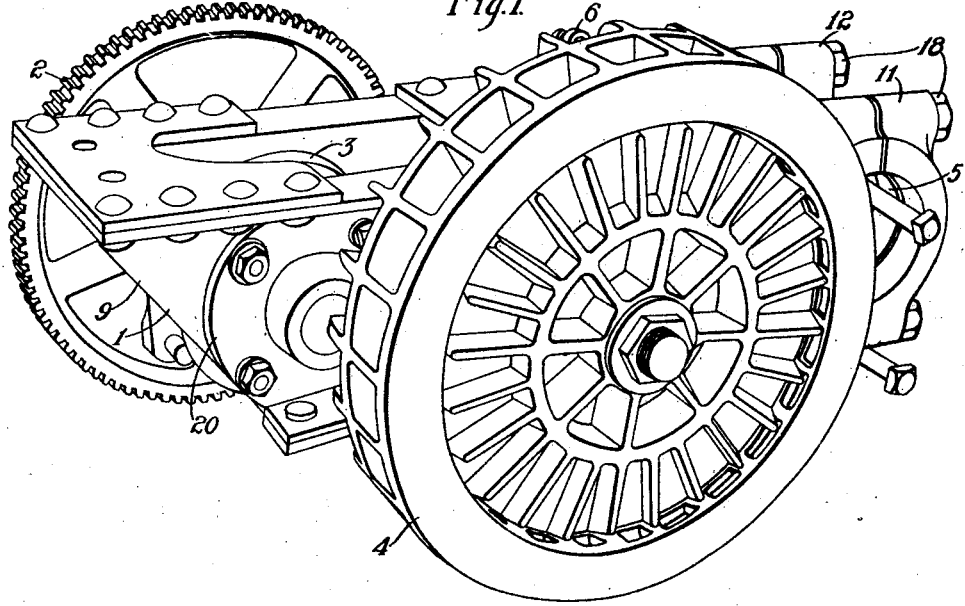
Figure 1 is a perspective view of our axle-power brake unit.

Fig. 5 to Fig. 29, inclusive, are detail views, partly in section and partly in elevation, of various portions of our braking apparatus;

Fig. 30 and Fig. 31 are views, respectively in elevation and in section, of a modified form of our axle-power brake; and Fig. 32 is a detail view of a portion of the apparatus shown in Figs. 30 and 31.

Referring to Fig. 1 to Fig. 29 of the drawings, the apparatus here shown comprises a box frame or body 1; a power-multiplying gear-wheel 2 that is attached to a winding drum or brake-cable sheave 3, power being transmitted to the gear-wheel 2 through the agency of one rotative element of a combined clutch and fan device 4, the other rotative element being mechanically coupled to a car axle which passes through the bearing or journal 5; and a brake-controlling lever or arm 6.

Figure 3:
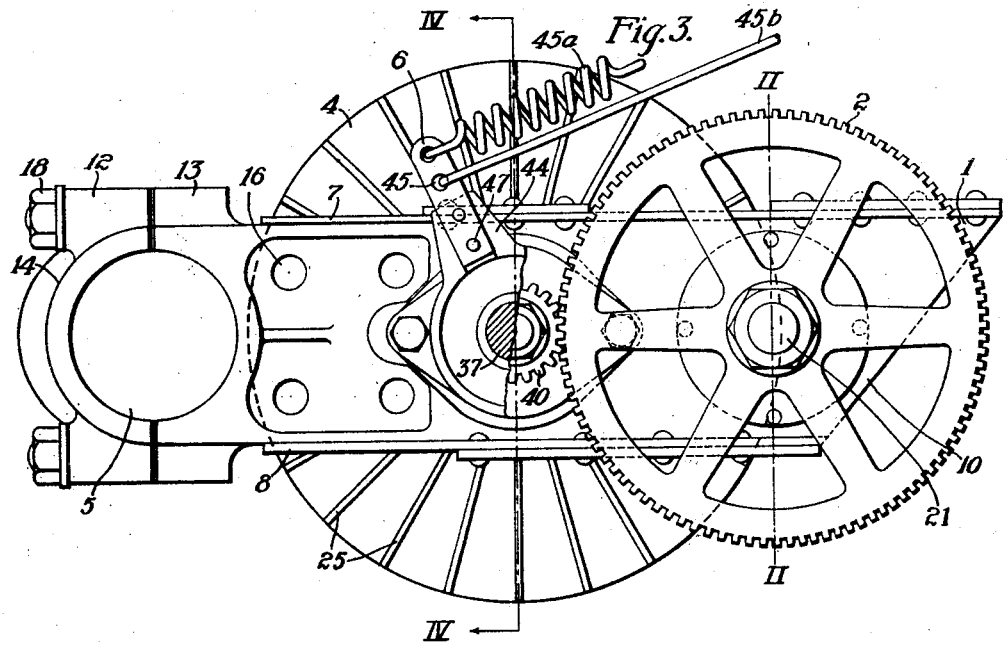

The box frame 1 comprises a top plate 7, a bottom plate 8 and a plurality of channel members 9 and 10 forming side plates that are riveted to the top plates 7 and bottom plate 8, as clearly shown in Fig. 3, for example. Suitable re-enforcing plates of smaller size are also riveted to various portions of the box frame 1, as illustrated in Fig. 1, to ensure a rigid and reliable body structure for the brake device.

The left-hand end of the box frame 1 in Fig. 1 is adapted to be spring-supported by an adjacent portion of the car body or truck frame (not shown); while the other end of the box frame terminates in a plurality of alined split axle-bearings 11 and 12 through which a car axle (not shown) extends.

Referring to the axle-bearing 12, which is shown in detail in Figs. 13, 14 and 15, the bearing comprises a semi-annular member 13 having an extension or wing that is provided with rivet holes 15 to be secured to the corresponding channel member or side frame 10 by means of a plurality of rivets 16. A coacting axle-cap 14 serves to complete the enclosure of the axle (not shown), and a plurality of bolt-holes 17 are provided for the purpose of permitting the axle-cap 14 to be rigidly secured to the other bearing member 13 by means of suitable bolts 18.

In the modification of our invention that is shown in Figs. 30 and 31, substantially the entire braking system, including the truck axle and the brake chain, is shown in order to afford a full visual comprehension of the complete operation of my axle-power brake; but all the elements external to the self-contained unit that is shown in Fig. 1 are not illustrated in connection with the preferred modification of our invention that is shown in Figs. 1 to 27, inclusive, since it is not deemed necessary, for a clear understanding of our invention, to add to the drawings in this respect.

Figure 2:
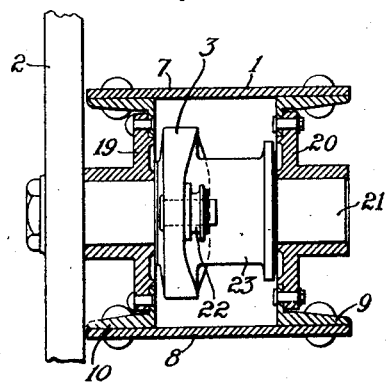
Fig. 2 and Fig. 4 are transverse sectional views taken along the lines II—II and IV—IV, respectively, of Fig. 3, which is a view in rear elevation of the apparatus shown in Fig. 1.

Referring to Fig. 2, a pair of alined journals or sleeves 19 and 20 are bolted to, and reside within, openings in the channel members or side frames 10 and 9, respectively, to support and position a shaft 21. To one end of the shaft 21 is rigidly secured the gear-wheel, 2, while the winding drum or cable sheave 3 is securely attached to an intermediate portion of the shaft 21, entirely within the box frame 1. The cable sheave 3 (see Figs. 27 and 28) is of a special form comprising a terminal pin 22, to which one end of the brake cable or chain 80 is fastened, and a drum or cam 23 of a spiral form suitable for providing an effective winding or reeling of this chain or cable in either direction of vehicle travel.

It should be noted that, by reason of the fact that the pin 22 is placed at a considerable distance from the drum axis, a very rapid "take-up" of the brake-chain or cable 80 is obtained in either direction. In other words, the effect of a relatively large drum is secured upon initial application of the brake, which insures a quick retarding action upon the vehicle. This action is particularly desirable when the car is to be started on an up-grade, since only a slight backward movement will be obtained, under any circumstances, before the brakes are set.

Figure 4:
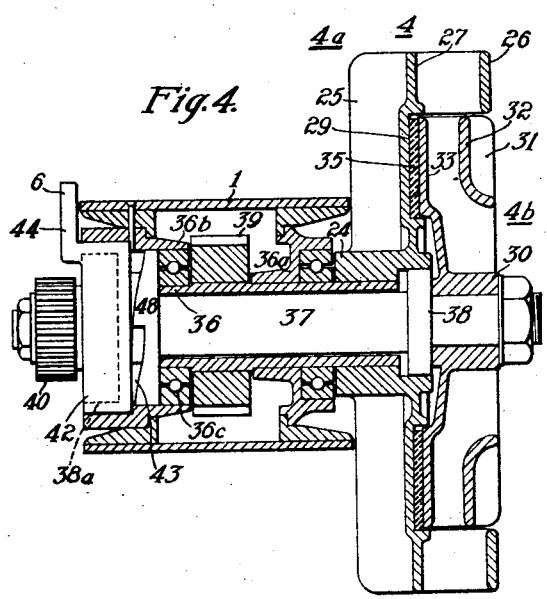

Referring now to Fig. 4 and to the detail views of the parts there shown, the clutch-and-fan device 4 comprises an outer clutch member 4a (see Figs. 5, 6 and 7) having a central hub 24 and a plurality of radially and longitudinally extending vanes or ribs 25 which, as clearly shown in Fig. 8, are integrally connected by means of annular bands or rings 26 and 27, the latter integrally extending to the hub 24 and being provided with an annular recess or groove 29 for a purpose to be set forth. By reason of the construction just described, a plurality of rectangular openings or ducts 28 are provided in the periphery of the outer clutch member 4a to assist in the ventilating action of the clutch device 4, as subsequently more fully set forth.

The inner clutch member 4b (see Figs. 10, 11 and 12) comprises a hub 30, a plurality of vanes or ribs 31 on the rear side thereof (see also Fig. 9), which are integrally connected by means of a curved annular plate or band 32, and a front disk 33 that is integrally attached to the hub 30. In this way, again, rectangular openings or ventilating ducts 34 are provided in the clutch member and, as a result of this chambered construction and the concentric relation of the two clutch members, an effective fan action is provided during rotative movement of either or both of the clutch members by reason of the suction that is set up in the various ducts by the passage of the sets of vanes or ribs through the air. In this way, all the working parts of the clutch device 4 are maintained at a relatively low temperature, since, in addition to the radiation of heat that is effected through the outer surfaces of the clutch members, the effective fan action just described takes place.

For the purpose of providing a reliable braking action, a loose annular disk or friction plate 35 of suitable material, such as pressed cork, asbestos, etc., is placed in the space between the front disk 33 of the inner clutch member 4 and the confronting face of the recess or groove 29 in the outer clutch member 4a. (See also Fig. 29.) By reason of this construction, the clutch disk 35 is reliably maintained in position, although the necessary slipping of the clutch members over each other may be readily effected without danger of injury to the disk 35. Moreover, by reason of the use of a loose friction-plate 35, it may be very easily and inexpensively replaced in the event of wearing too thin.

The outer clutch disk 4 is rigidly secured, by a press fit, or otherwise, to a sleeve 36, shown in detail in Figs. 17 and 18, that loosely surrounds a shaft 37, shown in detail in Fig. 16. One end of the shaft 37 is rigidly secured to the hub 30 of the inner clutch member 4b, a ball-bearing 38 being preferably provided between the shaft 37 and the hub 24 of the outer clutch member 4a, while a second ball-bearing 38a encloses the shaft near the other end. A plurality of bearing or journal supports 36a and 36b are mounted within suitable openings in the channel members or side frames 10 and 9, respectively, and serve to carry a pair of ball-bearings 36c for the sleeve 36, to an intermediate portion of which a main pinion or axle-power-transmitting device 39 is rigidly secured.

The pinion 39 is employed to receive energy from the associated car axle through the agency of a gear-wheel (not shown) that is adapted to be located between the axle-bearings 11 and 12. In this way, the pinion 39 and, therefore, the outer clutch member 4a, rotates with the car axle or, in other words, moves whenever the vehicle is in motion.

The left-hand end of the shaft 37 in Fig. 4 is provided with a rigidly attached pinion 40, which is further shown in Figs. 21 and 22 and which is adapted to mesh with the gear-wheel 2.

The inner clutch member 4b and, therefore, the pinion 40 and the gear-wheel 2 are stationary whenever the two clutch members are not forced into engagement by means of cam devices about to be described; that is, whenever the brakes are not applied.

A block or collar 41 is secured to the shaft 37 to abut against the inner face of the pinion 40, and a lever cam block 42 (see Figs. 23 and 24), having a plurality of teeth or cam projections 43 and an extension or ear 44, loosely encloses the collar 41. A lever arm 45 (see Figs. 19 and 20) is provided with a plurality of openings 46 whereby the arm may be secured, by rivets 47 (see Fig. 3) to the extension or ear 44 of the lever cam block 42.

A spring 45a serves to bias the lever cam block 42 to the illustrated position, whereby the clutch members normally engage the friction-plate 35 to thus set the vehicle brakes whenever pressure on the lever arm 45 is released. In this way, a "dead man's release" is provided.

Any suitable rigging may be provided between the lever arm 45 and the operator's station on the car platform, whereby movement of the lever arm and consequent graduated release of the brake, as hereinafter described in detail, may be provided whenever desired. For example, a foot-lever or pedal (not shown) may extend through a slot in the platform floor and be directly or indirectly pivoted, as by a rod 45d, to the lever arm 45.

The preferred form of control gear is set forth and claimed in a co-pending application of Louis M. Aspinwall, Serial No. 430,150, filed Dec. 13, 1920, and assigned to the Westinghouse Electric & Manufacturing Company.

A second cam block 48, having a plurality of teeth or cam projections 49 (see Figs. 25 and 26), loosely surrounds the shaft 37 at one end of the sleeve 36 and is non-rotatably supported in the journal support 36b, in a position confronting the toothed face of the lever cam block 42. The block 48 abuts the end of the sleeve 36. Normally, that is, when the brake is applied, the cam blocks 42 and 48 are disengaged to the extent shown in Fig. 4 and, therefore, the clutch members 4a and 4b occupy the illustrated closed or in-contact position.

The operation of the illustrated apparatus may be set forth as follows. Upon the application of pressure to the lever arm 45, in opposition to the spring 45a, by means of the above-mentioned pedal rod or otherwise, the teeth 43 of the lever cam block 42 remain in engagement with the teeth 49 of the cam block 48 but effect a lesser mutual wedging action and thus gradually release the pressure tending to force the inner clutch disk 4b into engagement with the outer clutch disk 4a and effect a progressively smaller degree of frictional engagement of the friction plate 35 within the groove or recess 29. Whenever the two clutch members are in close engagement, the continuous movement of the outer clutch disk 4a is transmitted to the inner clutch disk 4b, whereby, in turn, the meshing of the pinion 40 and the gear-wheel 2 serves to rotate the winding drum or cable sheave 3 and thus apply the familiar chain or cable brake upon the vehicle. When the pressure on the brake shoes has reached the predetermined amount necessary to provide proper retarding action, the reaction in the braking system will be sufficient to cause a slipping between the clutch surfaces, and such slipping will continue and will maintain the necessary braking pressure until the car is brought to rest.

When the spring-biased lever arm 45 is permitted to return to the illustrated position, either gradually or suddenly, the lever cam block 42 assumes the position shown, whereby the block 42, the shaft 37 and the inner clutch member 4b are forced to the extreme left-hand positions to set the brake.

During the braking action just described, the fan action of the clutch members 4a and 4b serves to maintain a relatively cool temperature of the working parts, as previously mentioned.

In Fig. 28, a cable 80 is shown secured to the eccentrically located terminal pin 22. The cable makes a few turns around the drum portion 23 and is then fastened to a spring device 81, which, in turn, may be attached to a brake-shoe lever 82. In this way, a shock-absorbing link is provided to insure a graduated and smoothly continuous brake application.

The spring device 81 is so constructed that a fully operative mechanical connection for the brake will obtain even though the coil spring 83 be broken. This result is made possible by the provision of two links 84 and 85 which loosely interlink the portions of the brake cable 80 and which are enclosed by the spring 83. Adequate braking is thus insured at all times.

Referring to Figs. 30 and 31, the modified form of my invention here shown comprises, in general, a case or enclosing frame 51, the upper part of which is movable, as indicated in Fig. 31, to permit inspection and replacement of working parts; a power-multiplying gear-wheel 52 that is mechanically attached to a winding drum or cable sheave 53; and a clutch-and-fan device 54 for deriving energy from the car axle 55 and transmitting it to the winding drum 53 when actuated by a controlling lever 56.

The general arrangement of parts is the same as that described in connection with the preferred form of our invention, the winding drum being located near one end of the frame or case 51, and the car axle 55, upon which a car-wheel 57 is shown as mounted, being located near the other end of the frame.

The power-multiplying gear-wheel 52 is rigidly mounted on a shaft 58 that has suitable bearings supported in the frame 51, and the mechanically associated winding drum 53 is adapted to receive a brake chain 59, in accordance with a familiar construction.

The gear-wheel 52 is adapted to mesh with a pinion 60 which is mounted upon a suitably journaled shaft 61. Upon an intermediate portion of the shaft 61 an inner clutch member or disk 62 is keyed for slidable mounting, while an annular split disk 63 (see Fig. 32) of suitable material, such as pressed cork or asbestos, is loosely disposed between the inner clutch member 62 and the outer clutch member 64. The two clutch members 62 and 64 are again provided with a plurality of vanes or ribs, such as 64a, for providing the previously-described ventilating or fan action.

In this way, a braking apparatus is again provided wherein a high-speed clutch device is interposed between a low-speed car axle and a low-speed winding drum.

The outer clutch member 64 is rigidly mounted upon a sleeve 65 that loosely encloses the shaft 61 and which, in turn, is supported by suitable bearings or journals 66. A main pinion 67 is securely fastened to the sleeve 65 and meshes with a power gear-wheel 68 which is keyed to the car axle 55, the supporting pedestal or bearing block 69 therefor being suitably bolted to the lower part of the case or frame 51.

For the purpose of biasing the clutch members 62 and 64 to the closed or engaged position, a coil spring 70 encloses the end of the shaft 61 remote from the pinion 60. The spring 70 presses upon a thrust or ball-bearing 71 that is provided between the spring 70 and a sliding collar 72 upon the shaft 61, whereby the clutch members are normally forced into contact. In a similar manner, a thrust or ball bearing 73 is provided between the confronting faces of the pinions 60 and 67, which are respectively mounted upon the shaft 61 and the sleeve 65.

It should be noted that, by reason of the provision of the split disk 63, replacement of a worn disk is a relatively simple matter. By forcing the thrust bearing 71 outwardly to open the clutch device, in opposition to the action of the spring 70, the worn half-disks may be removed and the new members inserted, the entire operation being effected without the use of tools.

The controlling mechanism comprises a bell-crank lever 74, a bifurcated end of which abuts against the flanged portion of the collar 72, while the lever is mounted, at the junction-point 75 of its arms, upon a projection of the frame or case 51. A release spring 77 has its inner end fastened to the bell-crank lever 74, near the outer end 76 thereof, to oppose the clutch-closing action of the spring 70. The other end of the spring 77 may be suitably connected to an operating pedal, as indicated, for permitting a graduated release of the clutch engagement and, therefore, of the braking effort, under the control of the car operator.

The general operation of the modification of our apparatus just described may be set forth as follows. Upon application of pressure by a pedal, or otherwise, to the spring 77 and the outer end 76 of the bell-crank lever 74, as indicated by the arrow, the action of the biasing spring 70 is overcome and the pressure of the collar 72 upon the inner clutch disk 62 is lessened to effect graduated frictional disengagement between the two clutch members 62 and 64. Consequently, the rotative movement of the outer clutch disk 64, which is derived from the axle gear-wheel 68, is transmitted, wholly or in part, through the shaft 61, the pinion 60 and the gear-wheel 52 to the winding drum 53, whereby the vehicle brakes are applied at any desired value, inversely dependent upon the pressure that is exerted upon the bell-crank lever 74.

Such pressure is maintained during the slipping of the clutch members in the manner previously described until the vehicle is brought to rest. Upon release of foot pressure from the bell-crank lever 74, the spring 70 causes the re-engagement of the clutch members by restoring the inner clutch member 62 to its illustrated left-hand position.

We do not wish to be restricted to the specific structural details or arrangement of parts herein set forth, as various modifications thereof may be made without departing from the spirit and scope of our invention. We desire, therefore, that only such limitations shall be imposed as are indicated in the appended claims.

We claim as our invention:

1. A braking apparatus comprising a box frame, a brake-applying device and an axle-receiving member located at opposite ends of said frame, an axle-power transmitting member enclosed by an intermediate portion of said frame, a clutch mechanism having its engaging elements located on one side of said frame, one of said elements being connected to said transmitting member, and connecting means for the other element and said brake-applying device located on the other side of said frame.

2. A braking apparatus comprising a box frame, a winding drum and an axle-bracket device located at opposite ends of said frame, an axle-power transmitting gear-wheel enclosed by an intermediate portion of said frame, a sleeve for carrying said gear-wheel, a plurality of cooperating clutch disk members located on one side of the frame and respectively mounted on said sleeve and mechanically connected on the other side of said frame to said winding drum, such mechanical connection further embodying a shaft located within said sleeve.

3. A braking apparatus comprising a box frame, a winding drum and an axle-bracket device located at opposite ends of said frame, an axle-power transmitting gear-wheel enclosed by an intermediate portion of said frame, a sleeve for carrying said gear-wheel, a shaft extending through said sleeve, a pinion mounted on said shaft to one side of said frame, a plurality of cooperating clutch disk members located on the other side of said frame and respectively mounted on said sleeve and said shaft, a gear-wheel for connecting said pinion and said winding drum, and means located between said pinion and said sleeve for effecting adjustable frictional engagement of said clutch members.

4. A clutch disk member having an engaging face, a plurality of ventilating vanes on another face, and embodying a plurality of radially extending ventilating ducts radially and longitudinally unalined with said engaging face.

In testimony whereof, we have hereunto subscribed our names this 31st day of December, 1919.

LOUIS M. ASPINWALL.
KARL A. SIMMON.